United States Patent [19]

Corzine et al.

[11] 4,317,118

[45] Feb. 23, 1982

[54] SYMMETRICAL BEAM-FORMING NETWORK

[75] Inventors: Robert G. Corzine, China Lake; Guenter H. Winkler, Ridgecrest, both of Calif.

[73] Assignee: The United States of America as represented by the Secretary of the Navy, Washington, D.C.

[21] Appl. No.: 411,588

[22] Filed: Nov. 8, 1973

[51] Int. Cl.[3] .............................................. H04B 7/00

[52] U.S. Cl. ................................. 343/100 R; 343/853

[58] Field of Search .................... 343/113, 119, 16 M, 343/853, 895, 100 R; 333/11

[56] References Cited

U.S. PATENT DOCUMENTS

| | | | |
|---|---|---|---|
| 3,071,769 | 1/1963 | Randall et al. | 333/11 |
| 3,175,217 | 3/1965 | Kaiser, Jr. et al. | 343/895 |
| 3,683,385 | 8/1972 | Corzine et al. | 343/113 R |
| 3,740,756 | 6/1973 | Boleslaw | 343/853 |

*Primary Examiner*—Theodore M. Blum

*Attorney, Agent, or Firm*—Robert F. Beers; W. Thom Skeer

[57] ABSTRACT

A beam-forming network having zero boresight error comprising a network having symmetry about the network centerline.

6 Claims, 13 Drawing Figures

1. THE Z AXIS IS THE MISSILE LONGITUDINAL (boresight) AXIS
2. THE POINT "T" REPRESENTS THE TARGETS
3. THE ANGLE $\theta$ IS THE ANGLE BETWEEN A LINE TO THE TARGET AND THE MISSILE LONGITUDINAL AXIS
4. THE ANGLE $\phi$ LIES IN THE X–Y PLANE
5. THE POINT "A" LIES IN THE X–Y PLANE
6. THE LINE T–B IS PERPENDICULAR TO THE X–Z PLANE
7. THE ANGLE $\theta_1$ LIES IN THE X–Z PLANE
8. THE LINE T–C IS PERPENDICULAR TO THE Y–Z PLANE
9. THE ANGLE $\theta_2$ LIES IN THE Y–Z PLANE

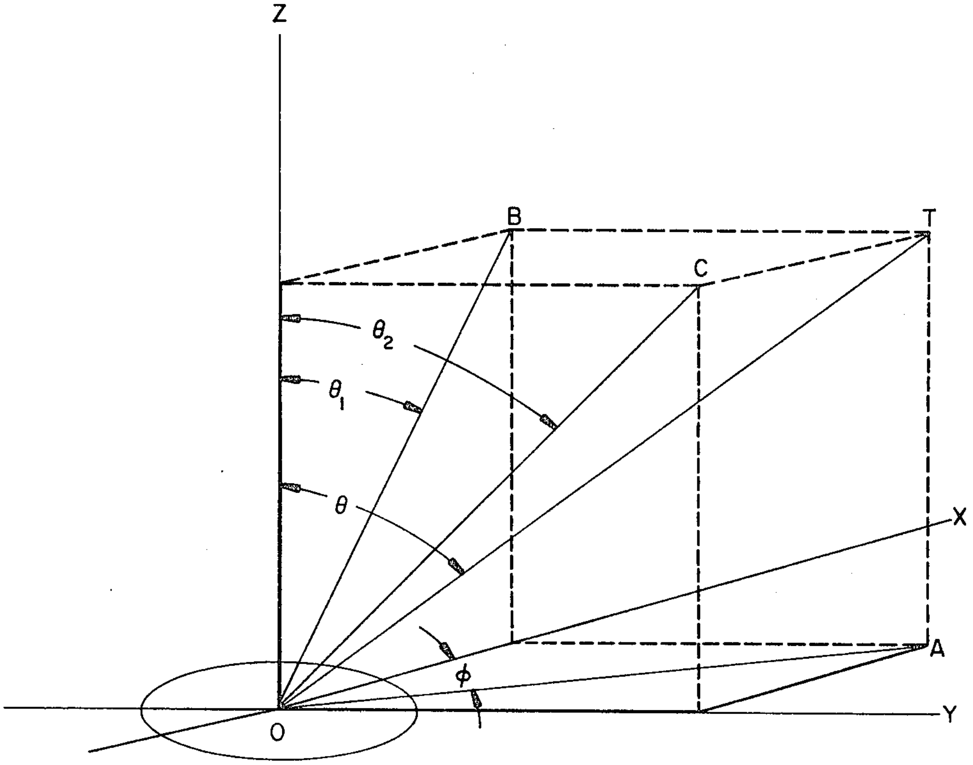

Fig. 6

SYMMETRICAL BEAM-FORMING NETWORK

BACKGROUND OF THE INVENTION

One of the important subsystems of the two-channel monopulse direction-finding system is the beam-forming network (BFN). Such direction-finding systems use an antenna that is excited in a sum (Σ) mode and a single complex difference (Δ) mode. It is the task of the beam-forming network to form four beams, two each in the azimuth and elevation planes from the Σ and Δ modes generated on the antenna. Mathematically, this means that with Σ and Δ as inputs, the beam-forming network provides $\Sigma+\Delta$, $\Sigma-\Delta$, $\Sigma+j\Delta$, and $\Sigma-j\Delta$ outputs.

Theoretically, a number of networks are feasible that can perform this function. They might consist of a combinaton of 3-dB quadrature couplers, magic-T's, in-phase power dividers and phase shifters. Not all of these components are necessary to form any one beam-forming network. FIG. 1 shows the simplest of such beam-forming networks and consists of three 3-dB quadrature couplers and one in-phase power divider. FIGS. 2 and 3 show other examples of conventional beam-forming circuits that have been widely applied by Radiation Systems, Inc. as well as other companies. FIG. 4 illustrates a standard product sold by Anaren Microwave, Inc. However, these devices which are illustrated in FIGS. 1 through 4 introduce boresight error dependent on the quality of the individual components, e.g. the amplitude and phase balance thereof.

BRIEF DESCRIPTION OF THE DRAWINGS

FIG. 6 illustrates the coordinate system involved;

DESCRIPTION OF THE PREFERRED EMBODIMENTS

Figure 1:
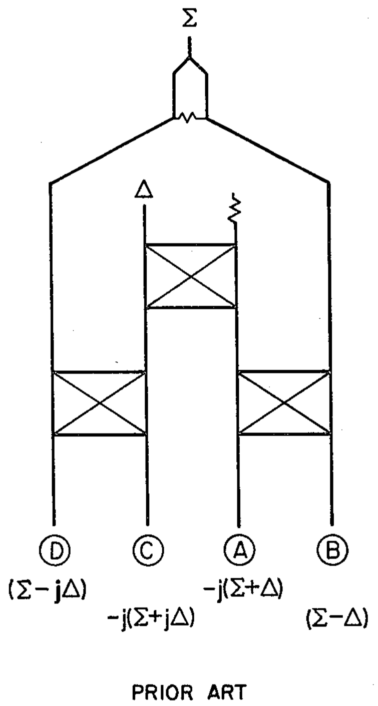
FIGS. 1 through 4 illustrate prior art beam-forming networks.
Figure 2:
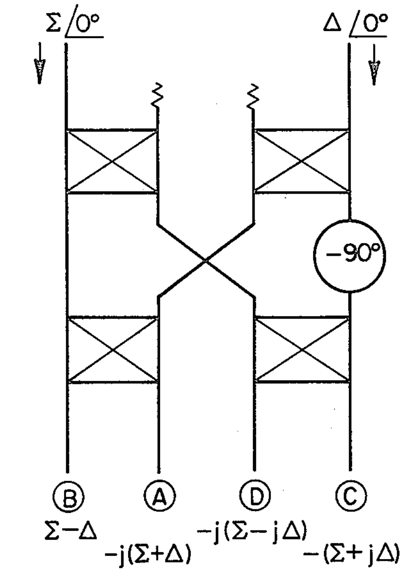
PRIOR ART Fig. 2
Figure 3:
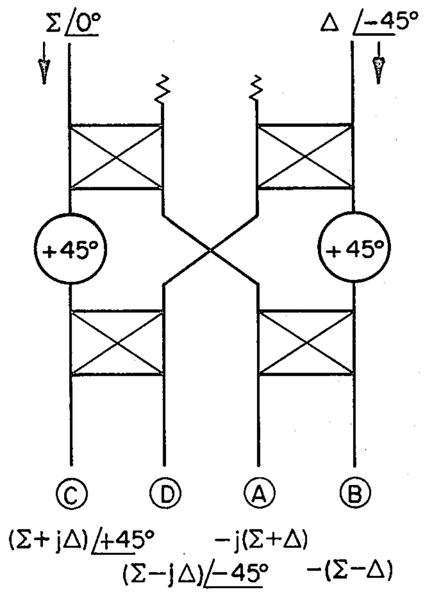
PRIOR ART Fig. 3
Figure 4:
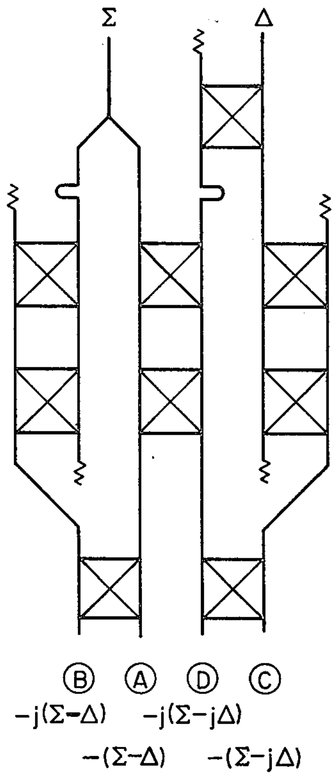
PRIOR ART Fig. 4
Figure 5:
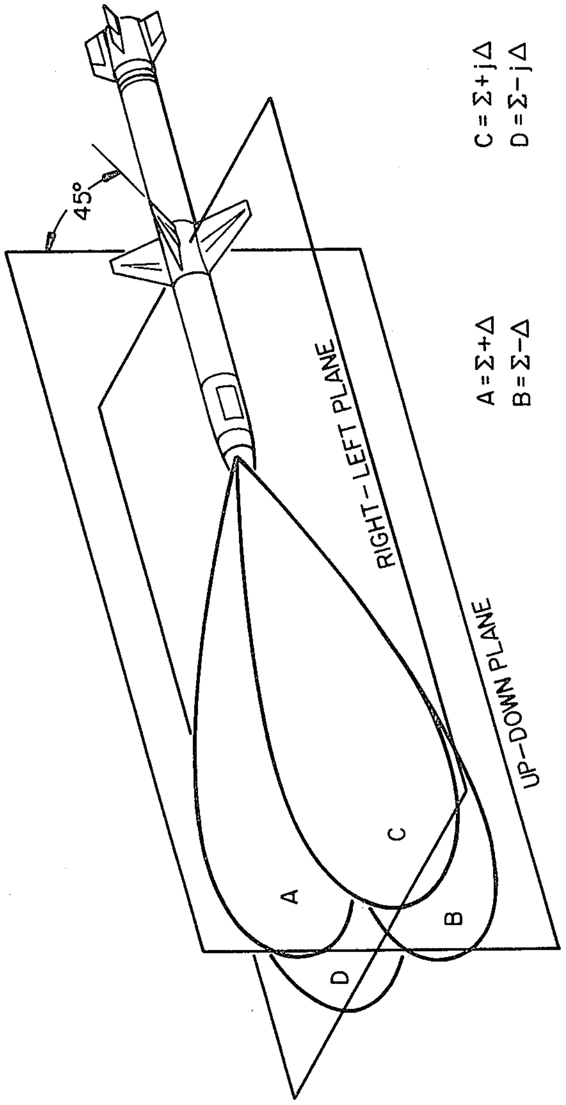
FIG. 5 illustrates beam orientation with respect to a missile.

FIG. 5 illustrates a two-channel monopulse direction-finding system and specifically the beam orientation with respect to a missile axis. The antenna involved is excited in a sum (Σ) mode with a single complex difference mode (Δ). It is the task of the beam-forming network to form four beams, two each in the azimuth and elevation planes, from the Σ and Δ modes generated on the antenna.

For gimbaled antenna systems, the system's pointing accuracy is determined by the boresight accuracy while, for body fixed antennas used with pursuit navigation techniques, the miss distance is directly related to boresight error, thus, boresight is an important parameter.

Figure 7:
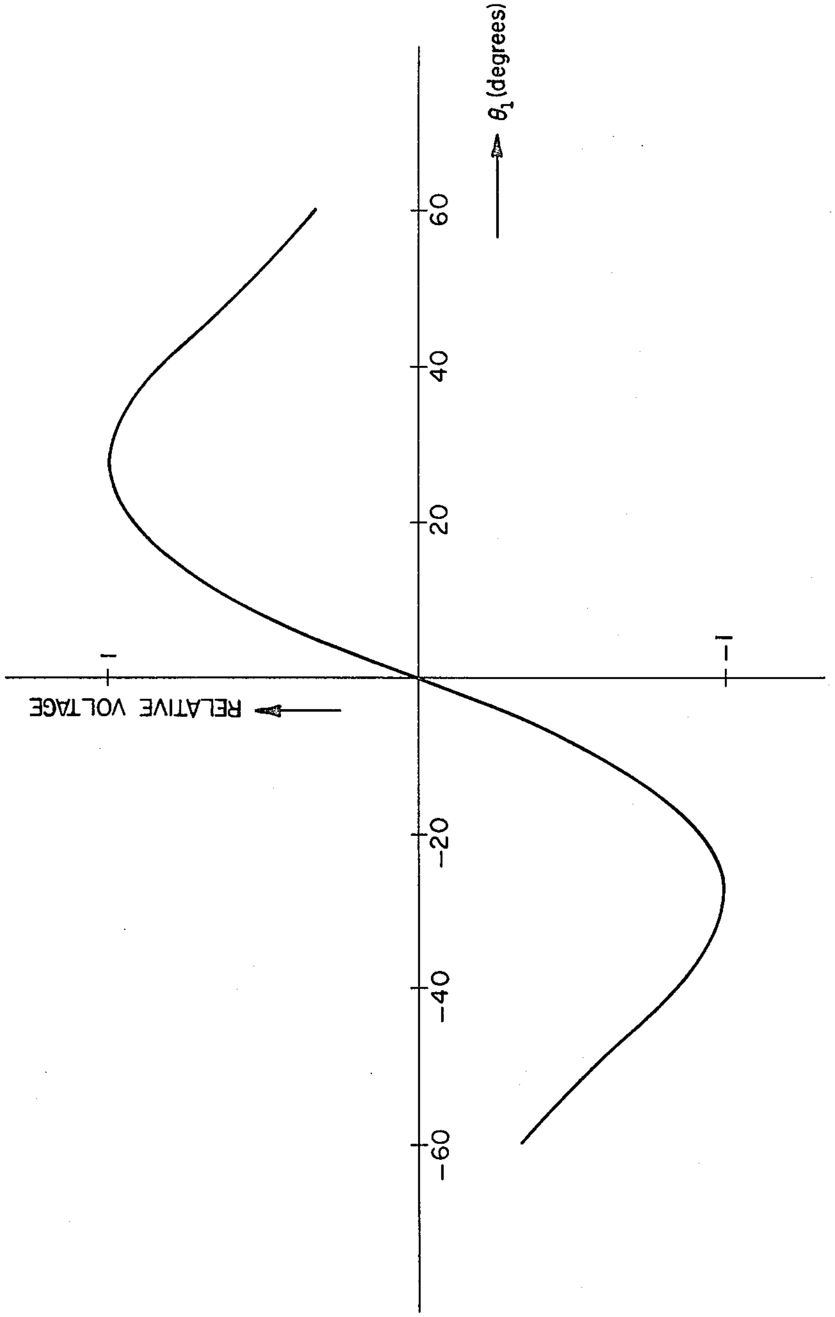
FIG. 7 is a graph of the crossover of $|\Sigma+\Delta|-|\Sigma-\Delta|$.

The boresight error introduced by all of the beam-forming networks illustrated in the prior art depends on the quality of the individual components, e.g. the amplitude and phase balance thereof. The reason for this is, that in order to obtain the elevation angle, $\theta_1$, as shown in FIG. 6, one must form the function $|\Sigma+\Delta|-|\Sigma-\Delta|$ which is illustrated in FIG. 7 and similarly, $|\Sigma+j\Delta|-|\Sigma-j\Delta|$ to obtain the azimuth angle $\theta_2$. When a signal is received from the direction of antenna boresight, it will be in the Δ mode radiation pattern null. $|\Sigma+\Delta|-|\Sigma-\Delta|$ will be zero only if the outputs A and B are equal. The same holds true for C and D. Any unbalance in the outputs A and B or C and D shows up as a boresight error introduced bythe beam-forming network.

Figure 8:
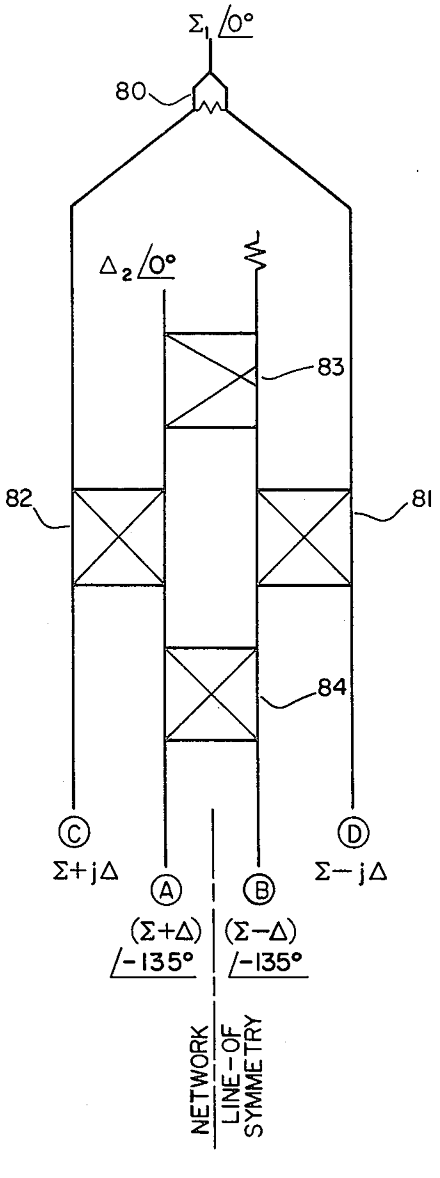
FIG. 8 illustrates one embodiment of a symmetrical beam-forming circuit.
Figure 9:
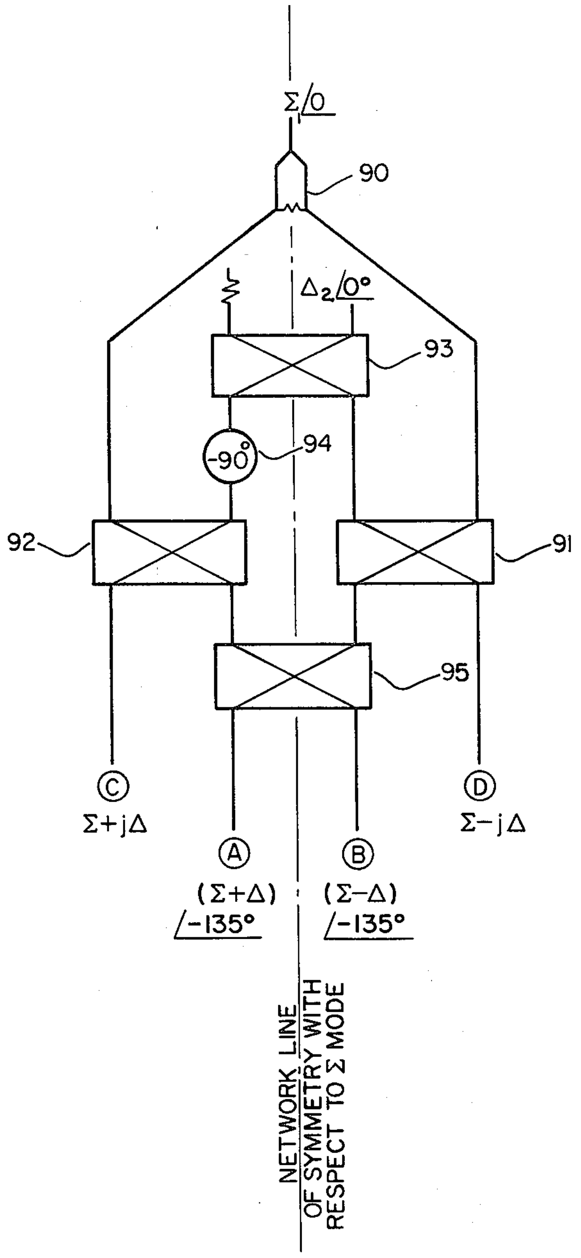
FIG. 9 is another embodiment of the symmetrical beam-forming network.
Figure 10:
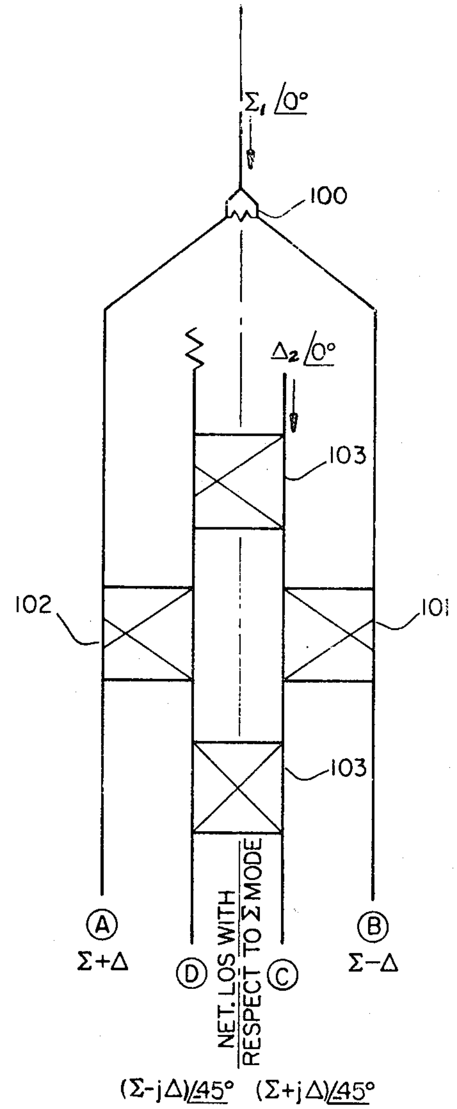
FIG. 10 is a further illustration of another symmetrical beam-forming network.

The boresight error can be kept to a minimum, theoretically zero error, if one uses a symmetrical network as shown in FIGS. 8 through 10. In FIG. 8, an input $\Sigma_1$ with zero phase angle is coupled in to an in-phase power divider 80. This type of power divider possesses a plane of symmetry and thus produces perfect power division independently of frequency. In-phase power dividers are of common knowledge. One output of the power divider is coupled as one input to a 3-dB quadrature coupler 81 and the other output of the power divider is coupled as an input to another quadrature coupler 82. The difference mode $\Delta_2$ at zero phase angle is coupled as one input to a 3-dB magic-T 83 which has two outputs. One output of the magic-T is coupled as another input to the 3-dB quadrature coupler 81 while the other output of the magic-T is coupled as another input to the quadrature coupler 82. One output of quadrature coupler 81 is coupled as an input to a further quadrature coupler 84 while one of the outputs of the quadrature coupler 82 is coupled as another input to the quadrature coupler 84. The output of quadrature coupler 82 corresponds to C while the outputs of quadrature coupler 84 correspond to A and B and the output of the quadrature coupler 81 corresponds to D. A, B, C and D correspond to the up-down, right-left beams respectively as shown in FIG. 5.

FIG. 9 illustrates another embodiment of the symmetrical beam-forming network wherein the $\Sigma_1$ mode is coupled to an in-phase power divider 90, one output of which is coupled as an input to a quadrature coupler 91. The other output of the in-phase power divider 90 is coupled as an input to another quadrature coupler 92. The $\Delta_2$ mode is coupled as one input to a further quadrature coupler 93 one output of which is coupled through a 90-degree phase shifter 94 as another input to the quadrature coupler 92. The other output of quadrature coupler 93 is coupled as another input to quadrature coupler 91. One output from quadrature coupler 91 and one output from quadrature coupler 92 are coupled as inputs to a further quadrature coupler 95. The output of quadrature coupler 92 corresponds to C, the output of quadrature coupler 95 corresponds to A and B while the output of quadrature coupler 91 corresponds to D. Again, all with respect to FIG. 5.

FIG. 10 illustrates another embodiment of the symmetrical beam-forming network wherein the sum mode ($\Sigma_1$) is coupled in to another in-phase power divider 100, one output of which is coupled as one input to a magic-T 101 and the other output of which is coupled as input to another magic-T 102. The difference ($\Delta_2$) mode is coupled as one input to a further magic-T 103 which has two outputs, one of which is coupled as another input to magic-T 101 and the other output of which is coupled as another input to magic-T 102. The magic-T's 101 and 102 also have two outputs, one output of each which is coupled as an input to a quadrature coupler 103. The other output of magic-T 101 corresponds to B while the other output of magic-T 102 corresponds to A. The outputs from the quadrature coupler 103 correspond to D and C respectively.

Figure 11:
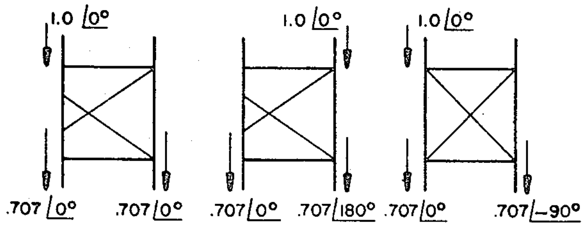
FIG. 11 illustrates the input-output voltage relations for magic-T and quadrature couplers.

FIG. 11 illustrates the input-output voltage relationships for the magic-T and quadrature couplers.

In the networks illustrated in FIGS. 8 through 10, each network has symmetry about the vertical centerline except for the ones using the magic-T as the input power divider for the difference mode. The magic-T does not have symmetry about this axis nor has it a perfect power split. For this network the boresight accuracy depends only on the phase and amplitude balance of the in-phase power divider, the likeness of the two outside quadrature couplers and the symmetry of the quadrature coupler that provides outputs A and B. The in-phase power divider is a component that can be designed to almost perfect performance and it is relatively easy to construct a network that has two 3-dB quadrature couplers which are alike. A vertical plane of symmetry through its center is a mathematical requirement for a quadrature coupler.

Figure 12A:
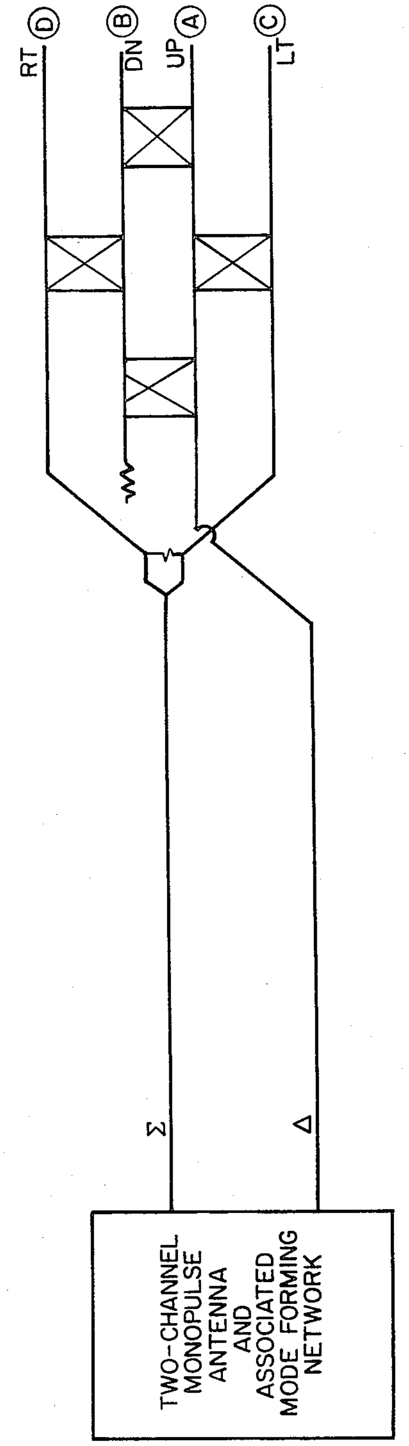
FIGS. 12*a* and 12*b* illustrate embodiments of radio frequency and intermediate frequency symmetrical beam-forming circuit implementations.
Figure 12B:
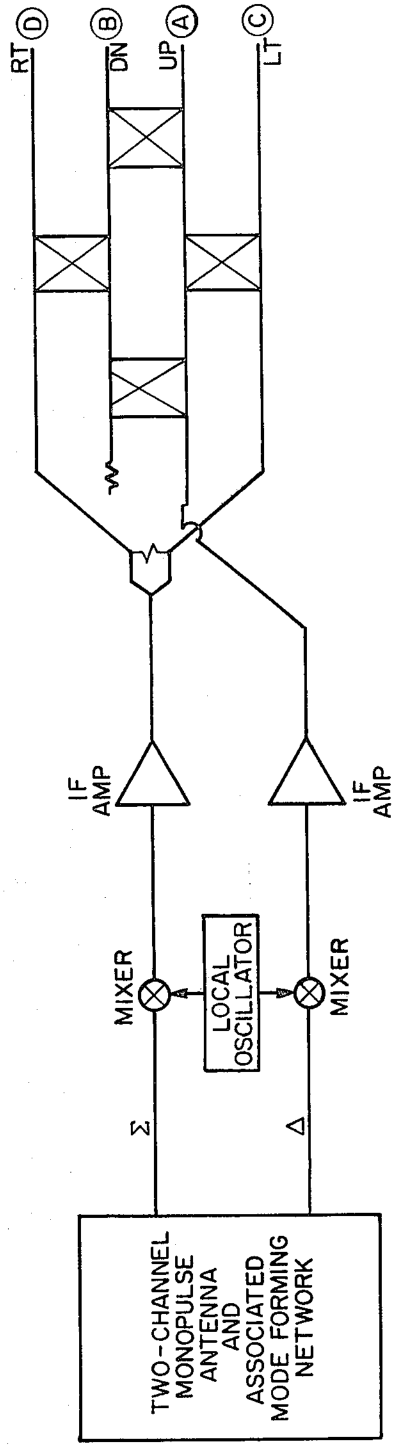

The symmetrical beam-forming networks can be used in a broad band radio-frequency configuration as illustrated in FIG. 12*a* or in a superheterodyne intermediate frequency configuration as shown in FIG. 12*b*. Either of the two configurations will allow perfect boresight performance with zero error, independent of component absolute performance when used with a two-channel monopulse implementation.

This "perfect" boresight will be maintained when a direction-finding system is implemented as shown in FIG. 12*b*, independent of any matching of the mixers or intermediate frequency amplifiers since, at boresight, no information is being transmitted in the Δ channel.

Many variations of the basic circuit shown in FIG. 8 are possible. For instance, the 3-dB quadrature couplers can be replaced with two tandem-connected −8.3 quadrature couplers or the magic-T can be replaced by a quadrature coupler and a 90-degree shifter as shown in FIG. 9. The in-phase power divider, magic-T and quadrature couplers are not illustrated in detail in that the same form no part of the present invention and are commonplace state of the art items at this time.

We claim:

1. A beam forming network for forming four beams from Σ and Δ modes generated on an associated antenna comprising;
- input means adapted to receive a sum (Σ) mode from an antenna;
- power divider means receiving the sum (Σ) mode from said input means and outputting two quantities in phase;
- other input means adapted to receive a difference (Δ) mode from said antenna;
- other power divider means receiving the difference (Δ) mode from said other input means and outputting to quantities 180° out of phase with respect to one another;
- beam-forming means having inputs and four outputs;
- said inputs of said beam forming means operatively receiving the two sum outputs and two difference outputs;
- said beam-forming means being operative to provide $\Sigma+j\Delta$, $\Sigma+\Delta$, $\Sigma-\Delta$, and $\Sigma-j\Delta$ at the respective outputs thereof.

2. The beam-forming network of claim 1 wherein; said beam-forming network is symmetrical.

3. The beam-forming network of claim 1 wherein said beam-forming means comprises;
- a hybrid coupler having inputs and outputs;
- one of said inputs of said hybrid coupler receiving an output from said other power divider means;
- another of the inputs of the hybrid coupler receiving an output from the in-phase power divider;
- another hybrid coupler having inputs and outputs;
- one of said inputs on said another hybrid coupler receiving the other output from said other power divider means;
- another of the inputs of the another hybrid coupler receiving the other output from said in-phase power divider;
- quadrature coupler means having inputs and outputs;
- one input of said quadrature coupler means receiving an output from the hybrid coupler;
- another input of said quadrature coupler means receiving an output from said another hybrid coupler.

4. The beam-forming network of claim 1 wherein said beam-forming means comprises;
- a quadrature coupler having inputs and outputs;
- one input to said quadrature coupler receiving an output of said other power divider means;
- another input to said quadrature coupler receiving an output from said in-phase power divider means;
- another quadrature coupler having inputs and outputs;
- one input of said another quadrature coupler receiving the other output from said other power divider means;
- another input of said another quadrature coupler receiving the other output of said in-phase power divider means;
- a further quadrature coupler having inputs and outputs;
- one of said inputs of said further quadrature coupler receiving an output of the first mentioned quadrature coupler;
- another of said inputs of said further quadrature coupler receiving an output said another quadrature coupler.

5. The beam-forming network of claim 4 wherein;
- the other power divider means comprises;
- an additional quadrature coupler having inputs and outputs;
- one input of said additional quadrature coupler receiving the difference Δ mode;
- phase shifter means having an input and output;
- the input to phase shifter means receiving an output of the additional quadrature coupler and providing a phase shifted output;
- another output of the additional quadrature coupler providing an input to one of said quadrature coupler and another quadrature coupler;
- the output of said phase shifter means being coupled as an input to the other of said quadrature coupler and another quadrature coupler.

6. A beam-forming network;
- input means adapted to receive a sum (Σ) mode input from an associated antenna system;
- other input means adapted to receive a difference (Δ) mode input from the associated antenna system;
- said network being operative to form outputs $|\Sigma+\Delta|=|\Sigma-\Delta|$ and $|\Sigma+j\Delta|=|\Sigma-j\Delta|$;
- said network having a plane of symmetry with respect to the sum mode input such that $|\Sigma+\Delta|=|\Sigma-\Delta|$ and $|\Sigma+j\Delta|=|\Sigma-j\Delta|$ for a signal received on boresight irrespective of the absolute performance of components within the network.

* * * * *